US009941700B2

(12) United States Patent
Bhavaraju et al.

(10) Patent No.: US 9,941,700 B2
(45) Date of Patent: Apr. 10, 2018

(54) UTILITY SCALE RENEWABLE ENERGY SYSTEM CONTROLS FOR RAMP-RATE, VOLTAGE, AND FREQUENCY MANAGEMENT

(71) Applicant: EATON CORPORATION, Cleveland, OH (US)

(72) Inventors: Vijay Bhavaraju, Germantown, WI (US); Qiang Fu, Milwaukee, WI (US); Yakov L. Familiant, Milwaukee, WI (US); Christopher S. Thompson, Kingston, RI (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 467 days.

(21) Appl. No.: 14/585,835

(22) Filed: Dec. 30, 2014

(65) Prior Publication Data
US 2016/0190810 A1   Jun. 30, 2016

(51) Int. Cl.
*H02J 3/28* (2006.01)
*H02J 3/38* (2006.01)
*H02J 3/16* (2006.01)

(52) U.S. Cl.
CPC ........... *H02J 3/383* (2013.01); *H02J 3/16* (2013.01); *H02J 3/28* (2013.01); *H02J 3/382* (2013.01); *Y02E 10/563* (2013.01); *Y02E 10/566* (2013.01); *Y02E 40/34* (2013.01); *Y02E 70/30* (2013.01)

(58) Field of Classification Search
None
See application file for complete search history.

(56) References Cited

U.S. PATENT DOCUMENTS

| 2006/0132993 A1 | 6/2006 | Delmerico et al. |
| 2007/0173982 A1 | 7/2007 | Cardinal et al. |
| 2008/0143304 A1 | 6/2008 | Bose et al. |
| 2009/0218819 A1 | 9/2009 | Miller et al. |

(Continued)

FOREIGN PATENT DOCUMENTS

WO    2014/106095 A1    7/2014

OTHER PUBLICATIONS

European Patent Office, "International Search Report and Written Opinion" (for corresponding application PCT/US2015/067986), dated Apr. 6, 2016, 14 pages.

*Primary Examiner* — Jared Fureman
*Assistant Examiner* — Joel Barnett
(74) *Attorney, Agent, or Firm* — Eckert Seamans

(57) ABSTRACT

An energy system includes renewable energy sources each including an inverter. The renewable source inverters are coupled to a distribution line in a manner wherein power combines additively. The system also includes an energy storage source including an energy storage inverter coupled to the distribution line between the point of interconnection and the renewable source inverters. Finally, a control system is structured to: (i) control a voltage at the point of interconnection by controlling a renewable source reactive power output by the renewable source inverters and an energy storage reactive power output by the energy storage inverter, and (ii) provide power ramp rate control for the renewable energy system by controlling at least one of a renewable source real power output by each of the renewable source inverters and a first energy storage real power output by the energy storage inverter.

24 Claims, 6 Drawing Sheets

(56) References Cited

U.S. PATENT DOCUMENTS

| | | | |
|---|---|---|---|
| 2010/0114397 A1* | 5/2010 | Cardinal | H02J 3/383 |
| | | | 700/297 |
| 2010/0145533 A1 | 6/2010 | Cardinal et al. | |
| 2010/0231045 A1* | 9/2010 | Collins | F01B 21/04 |
| | | | 307/47 |
| 2012/0133209 A1* | 5/2012 | O'Brien | H02J 3/1828 |
| | | | 307/72 |
| 2013/0027992 A1* | 1/2013 | Bucker | H02J 3/26 |
| | | | 363/34 |
| 2013/0162043 A1* | 6/2013 | Ellena | H02J 3/38 |
| | | | 307/43 |

* cited by examiner

UTILITY SCALE RENEWABLE ENERGY SYSTEM CONTROLS FOR RAMP-RATE, VOLTAGE, AND FREQUENCY MANAGEMENT

BACKGROUND

Field

The disclosed concept relates generally to the generation and distribution of electricity by systems employing renewable energy sources, and, in particular, to a system and method for controlling and managing power ramp rates, frequencies and voltages in a renewable energy system that is to be interconnected with an existing electric power network (or electrical grid).

Background Information

The major resources for generating electricity on small islands (e.g., without limitation, Puerto Rico) have traditionally been in the form of fossil fuels, such as oil, coal, and natural gas. However, it is getting harder and more expensive to transport such fossil fuels to small islands for electricity generation. As a result, many small islands, like Puerto Rico, have looked to increase their utilization of utility connected renewable energy sources, such as solar photovoltaic (PV) systems and wind generation systems (commonly referred to as solar farms and wind farms), for electricity generation to supplement traditional fossil fuel-based generation.

However, solar PV systems and wind generation systems produce intermittent, variable power because the harvesting of the solar or wind energy varies with environmental factors such as cloud coverage, wind speed, etc. The intermittency of such renewable energy sources and the long distribution lines typically associated therewith often leads to undesirable voltage and frequency fluctuations in the distributed power system. The frequency problem is less severe for large utilities but the voltage issue exists. However, on small stand-alone grids such as those present on small islands for electricity generation, these fluctuations may lead to severe power quality issues leading to brown-outs, load shedding and, in extreme cases, complete shutdown of the generation and distribution system. As a result, small island power authorities, like the Puerto Rico Electric Power Authority (PREPA), have established technical requirements for interconnection of renewables with an existing electric power network (or electrical grid). Such technical requirements include requirements for managing rapid changes of the power output of the renewables (called "Ramp Rate Control"), requirements that mandate a minimum amount of power output by the renewables for responding to grid frequency changes (called "Frequency Response"), and requirements for controlling the voltage at the point of common coupling of the renewables to the distribution network to ensure that it meets predefined standards and limits (e.g., ANSI C84.1 or standards and limits set by the utility).

Therefore, there is a need for a system and method for cost-effectively controlling and managing power ramp rates, frequencies and voltages in a renewable energy system that is to be interconnected with an existing electric power network (or electrical grid).

SUMMARY

In one embodiment, a renewable energy system coupled to a point of interconnection (8) of an electrical distribution system is provided. The system includes a number of renewable energy sources each including a renewable source inverter structured to output a renewable source power, the renewable source inverter of each of the renewable energy sources being coupled to a distribution line in a manner wherein the renewable source powers of the renewable source inverters combine additively. The system also includes an energy storage source including an energy storage device coupled to an energy storage inverter, wherein the energy storage inverter is coupled to the distribution line between the point of interconnection and the renewable source inverters. Finally, the system includes a control system operatively coupled to the energy storage source and the number of renewable energy sources, wherein the control system is structured to: (i) control a voltage at the point of interconnection by controlling a renewable source reactive power output by each of the renewable source inverters and an energy storage reactive power output by the energy storage inverter, and (ii) provide power ramp rate control for the renewable energy system by controlling at least one of a renewable source real power output by each of the renewable source inverters and a first energy storage real power output by the energy storage inverter.

In another embodiment, a method of controlling a renewable energy system coupled to a point of interconnection of an electrical distribution system is provided. The renewable energy system includes a number of renewable energy sources each including a renewable source inverter and an energy storage source including an energy storage device coupled to an energy storage inverter. The method includes controlling a voltage at the point of interconnection by controlling a renewable source reactive power output by each of the number of renewable source inverters and an energy storage reactive power output by the energy storage inverter, and providing power ramp rate control for the renewable energy system by controlling at least one of a renewable source real power output by each of the renewable source inverters and a first energy storage real power output by the energy storage inverter.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
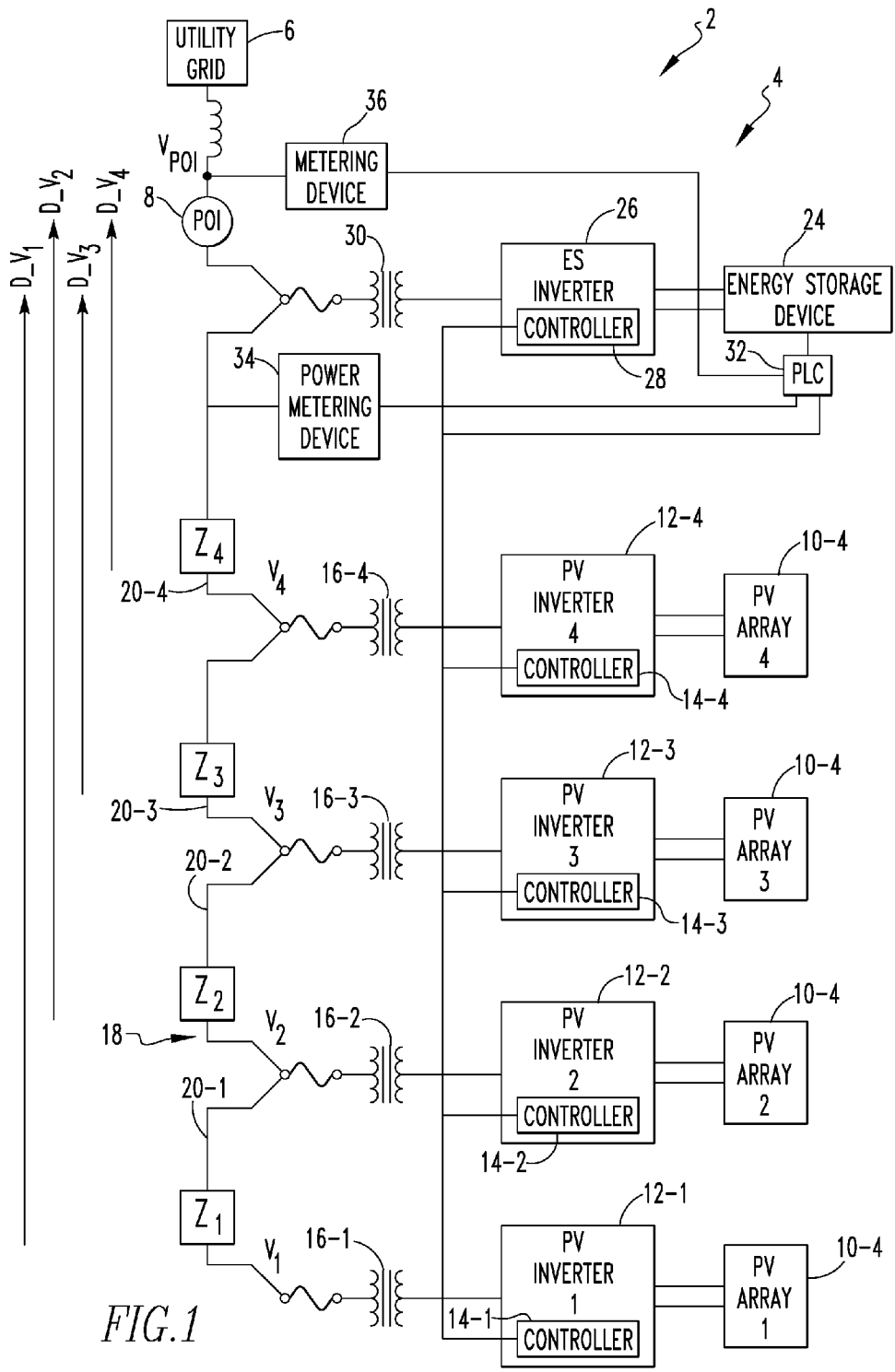
FIG. 1 is a schematic block diagram of an electrical distribution system including a renewable energy system according to an exemplary embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

As employed herein, the term "number" shall mean one or an integer greater than one (i.e., a plurality).

FIG. 1 is a schematic block diagram of an electrical distribution system 2 according to an exemplary embodiment of the disclosed concept. Electrical distribution system 2 includes a renewable energy system 4 that is interconnected with a utility grid 6 at a point of interconnection (POI) 8 (also referred to as a point of common coupling (PCC)). As described in greater detail herein, in the non-limiting exemplary embodiment, renewable energy system 4 includes a number of solar PV resources and a number of energy storage resources (only one is shown, but more are possible) and is structured and configured to provide voltage control at POI 8 using reactive power management and to provide ramp rate control and frequency response control using the number of energy storage resources. In an alternative embodiment described elsewhere herein (FIG. 7), frequency response control is provided using a diesel or natural gas generator instead of an energy storage resource. The system is integrated to meet the measurement of cumulative output of renewable sources and managing real and reactive power management from the energy storage source or sources. The system described can be of different sizes and can be duplicated as integrated subsystem of a larger renewable farm.

Referring to FIG. 1, renewable energy system 4 includes a number of photovoltaic (PV) arrays 10 each coupled to an associated photovoltaic (PV) inverter 12 having a controller 14 for controlling the operation thereof. In the non-limiting, illustrated exemplary embodiment, renewable energy system 4 includes four PV arrays 10, labeled 10-1, 10-2, 10-3, 10-4, and four associated PV inverters 12, labeled 12-1, 12-2, 12-3, 12-4 (having controllers 14 labeled 14-1, 14-2, 14-3, 14-4). It will be appreciated, however, that a greater or lesser number of PV arrays 10 and PV inverters 12 is also be used within the scope of the disclosed concept. As is known in the art, each PV array 10 includes a plurality of solar panels structured to absorb and directly convert sunlight into DC electrical current, and each PV inverter 12 is structured to convert the electrical current generated by the solar panels from DC to AC. These PV inverters 12 have a mode of operation where maximum power is extracted from the PV arrays 10. Further, these PV inverters 12 have additional controls to limit the power output even when the available power from the associated PV array 10 is higher. Also, these PV inverters 12 have the capability to absorb or supply reactive power. In the exemplary embodiment, these are 3-quadrant inverters that can inject positive and negative VARS and positive Watts into the utility connection.

As seen in FIG. 1, the AC electrical current output by each PV inverter 12-1, 12-2, 12-3, 12-4 is provided to an associated transformer 16-1, 16-2, 16-3, 16-4. The secondary, output side of each transformer 16-1, 16-2, 16-3, 16-4 is coupled to a distribution line 18 such that the AC electrical current output by the transformers 16 is additively provided on distribution line 18. The transformer steps up the inverter voltage to any suitable utility voltage (for example 13.2 kV). Distribution line 18 includes a first distribution line portion 20-1 having an impedance $Z_1$ provided between transformer 16-1 and transformer 16-2, a second distribution line portion 20-2 having an impedance $Z_2$ provided between transformer 16-2 and transformer 16-3, a third distribution portion 20-3 having an impedance $Z_3$ provided between transformer 16-3 and transformer 16-4, and a fourth distribution line portion 20-4 having an impedance it provided between transformer 16-4 and POI 8. These distribution lines could be underground cables or over head conductors with known impedances. In the illustrated embodiment, each PV array 10 measures several acres and hence the distance between the associated PV inverters 12 is large. As a result, the impedances $Z_1$, $Z_2$, $Z_3$, and it of the distribution line portions 20-1, 20-2, 20-3, and 20-4 need to be considered in the control scheme that is described herein. For simplicity, each of the impedances $Z_1$, $Z_2$, $Z_3$, and it will also include the impedance of the associated transformer 16. As will be appreciated by those of skill in the art, the voltage drop across each of the impedances $Z_1$, $Z_2$, $Z_3$, and $Z_4$ (labeled V1, V2, V3 and V4 in FIG. 1, each one being a vector) will depend on both the real and reactive power output from the associated PV inverter 12 and the magnitude of the particular impedance $Z_1$, $Z_2$, $Z_3$, and $Z_4$ (V=IZ). In addition, in the non-limiting, exemplary embodiment, each PV inverter 12-1, 12-2, 12-3, 12-4 is structured to estimate a voltage ($V_{PV}$) at the downstream end of the associated distribution line portion 20-1, 20-2, 20-3, 20-4 based on the current (a vector quantity) output by the PV inverter 12-1, 12-2, 12-3, 12-4 and the associated impedance $Z_1$, $Z_2$, $Z_3$, and $Z_4$. Each $V_{PV}$ is indicative of the voltage drop of the associated distribution line and is used as described in greater detail herein in the control scheme of the disclosed concept. In the exemplary embodiment, the inverters 12 are designed to operate over a wide voltage range and so the inverters 12 can control the $V_{PV}$ voltages $V_1$, $V_2$, $V_3$, $V_4$ over a wide range (for example +10% and −10% rated voltage)

As seen in FIG. 1, renewable energy system 4 further includes an energy storage device 24, such as, without limitation, a battery having a battery management system (BMS), that is coupled to an energy storage (ES) inverter 26 having a controller 28. Energy storage device 24 is structured to output DC current which is converted to an AC current by ES inverter 26. The output of ES inverter 26 is provided to a transformer 30 which is coupled to distribution line 18 at a point that is downstream from distribution line portion 20-4. Although only a single energy storage device 24 and a single ES inverter 26 are shown in the illustrated embodiment, it will be understood that a greater number of such components may also be used within the scope of the disclosed concept.

Renewable energy system 4 also includes a programmable logic controller (PLC) 32 (or a similar processing device) that is coupled to energy storage device 24 and each of the controllers 14 and 28. A power metering device 34 is coupled to distribution line 18 at a point that is downstream from distribution line portion 20-4. Power metering device 34 is structured to measure the total power generated and output to distribution line 18 by PV inverters 12 (i.e., the cumulative power of the PV inverters 12, both real and reactive). Power metering device 34 is coupled to PLC 32 so that the measurements made by power metering device 34 may be provided to PLC 32. An additional metering device 36 is coupled to POI 8 and is structured to measure, among other parameters, the voltage ($V_{POI}$) at POI 8 (sometimes also referred to as $V_{PCC}$), the real power (in kW) at POI 8, the reactive power (in kVAR) at POI 8, and the frequency ($F_{POI}$) at POI 8. The measurements made by metering device 36 are provided to PLC 32. The manner in which these measurements are used in the control scheme of the disclosed concept is described in greater detail herein.

As noted elsewhere herein, renewable energy system 4 is structured and configured to implement a scheme for controlling and managing the following parameters such that those parameters satisfy the specifications and/or limits imposed on renewable system 4: (i) the voltage $V_{POI}$ provided by renewable energy system 4 at POI 8 using reactive power management (i.e., by controlling the amount of reactive power provided by various components of renewable energy system 4), (ii) the frequency response of renewable energy system 4 using ES inverter 26 and the PV inverters 12, and (iii) the power ramp rate of renewable energy system 4 using ES inverter 26 and the PV inverters 12. The particulars of each aspect of the control scheme according to the disclosed concept are described in detail below in connection with FIGS. 2-6.

Figure 2:
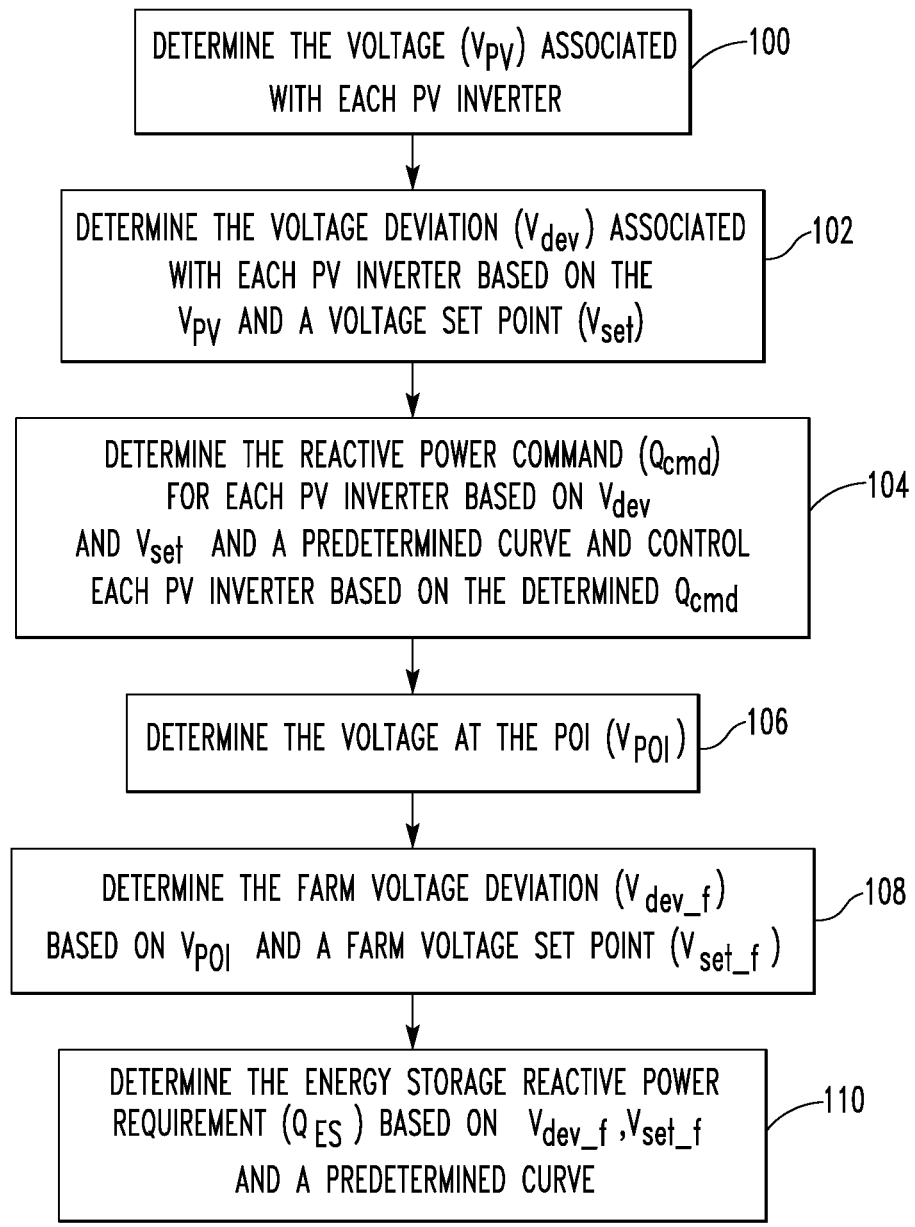
FIG. 2 is a flowchart showing a control methodology for controlling and managing the voltage at the point of interconnection of the electrical distribution system of FIG. 1 using reactive power management according to one particular, non-limiting exemplary embodiment of the disclosed concept.

FIG. 2 is a flowchart showing a control methodology for controlling and managing $V_{POI}$ using reactive power management according to one particular, non-limiting exemplary embodiment of the disclosed concept. In the exemplary embodiment, the control methodology shown in FIG. 2 is implemented in the form of a number of routines stored and executed by the inverter controllers 14 and 28 and system controller PLC 32. The control methodology of FIG. 2 begins at step 100, wherein the voltage $V_{PV}$ associated with each PV inverter 12-1, 12-2, 12-3, and 12-4 is determined by the associated controller 14. In the illustrated exemplary embodiment, each voltage $V_1$, $V_2$, $V_3$, $V_4$ is measured by the respective inverter 12 or estimated by the associated controller 14 as described herein, although it will be appreciated that other methods of obtaining such voltage levels are also possible. Next, at step 102, a voltage deviation ($V_{dev}$) is determined for each of the PV inverters 12-1, 12-2, 12-3, and 12-4 by the associated controller 14 which is, in each case, indicative of the voltage drop associated therewith. In the exemplary embodiment, each $V_{dev}$ is determined based on the estimated $V_x$ associated with each PV inverter 12-1, 12-2, 12-3, and 12-4, and a predetermined voltage set point value ($V_{set}$) (which may be the same for each PV inverter 12, or which may vary among the PV inverters 12) according to the following formula:

$$V_{dev}=V_{set}-V_x$$

Then, at step 104, a reactive power command ($Q_{cmd}$) is determined for each PV inverter 12-1, 12-2, 12-3, and 12-4 by the associated controller 14 with the knowledge of the line impedances $Z_1$, $Z_2$, $Z_3$, $Z_4$ in FIG. 1. The reactive power command $Q_{cmd}$ of each PV inverter 12-1, 12-2, 12-3, and 12-4 will determine the amount of reactive power that the PV inverter 12-1, 12-2, 12-3, and 12-4 will be caused to output for purposes of controlling the voltage drops D_V1, D_V2, D_V3 and D_V4 (FIG. 1). In the exemplary embodiment, the reactive power command $Q_{cmd}$ of each PV inverter 12-1, 12-2, 12-3, and 12-4 is determined based on the associated $V_{dev}$ and $V_{set}$, and a predetermined curve such as, for example, and without limitation, the exemplary curve 38 shown in FIG. 3. Typically, this curve is based on the impedance of the line between the point of connection and each of the inverters. This is for example the sum of the impedances $Z_1+Z_2+Z_3+Z_4$ for inverter-12-1. In one particular embodiment, the reactive power command calculation for each PV inverter 12-1, 12-2, 12-3, and 12-4 is given as follows:

$$Q_{cmd} = \frac{Q_m}{Zi} * \frac{V_{dev}}{V_{set}},$$

where the $Q_m$ is the reactive power required for inverter 'i' and $Z_i$ is the impedance between inverter 'i' and POI 8. In one particular implementation, the reactive power command calculation is performed as described above only if the determined $V_{dev}$ falls outside a predetermined dead band (for example: +4% and −6% of the rated voltage). In this implementation, if the determined $V_{dev}$ falls within the predetermined dead band, $Q_{cmd}$ of associated PV inverter 12-1, 12-2, 12-3, 12-4 is set to zero. Further the $Q_{cmd}$ can be a negative value for higher voltages and positive value for lower voltages at the POI 8.

As shown in step 104, after $Q_{cmd}$ of each PV inverter 12-1, 12-2, 12-3, 12-4 has been determined, each PV inverter 12-1, 12-2, 12-3, 12-4 is controlled by the associated controller 14 in accordance with that command to cause the PV inverter 12-1, 12-2, 12-3, 12-4 to output the commanded amount of reactive power.

Next, at step 106, the voltage $V_{POI}$ is determined. In the exemplary embodiment, $V_{POI}$ is measured by metering device 36. Then, at step 108, a farm voltage deviation ($V_{dev\_f}$) is determined by PLC 32 based on the determined $V_{POI}$ and a predetermined renewable farm voltage set point ($V_{set\_f}$) according to the following formula:

$$V_{dev\_f}=V_{set\_f}-V_{POI}$$

Figure 3:
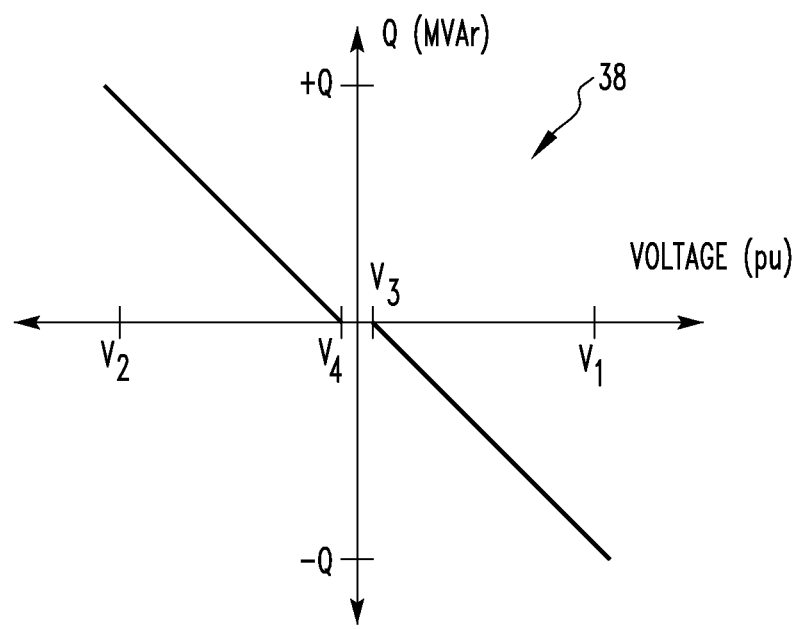
FIG. 3 is a schematic diagram of an exemplary droop curve according to an exemplary embodiment of the disclosed concept.
Figure 5:
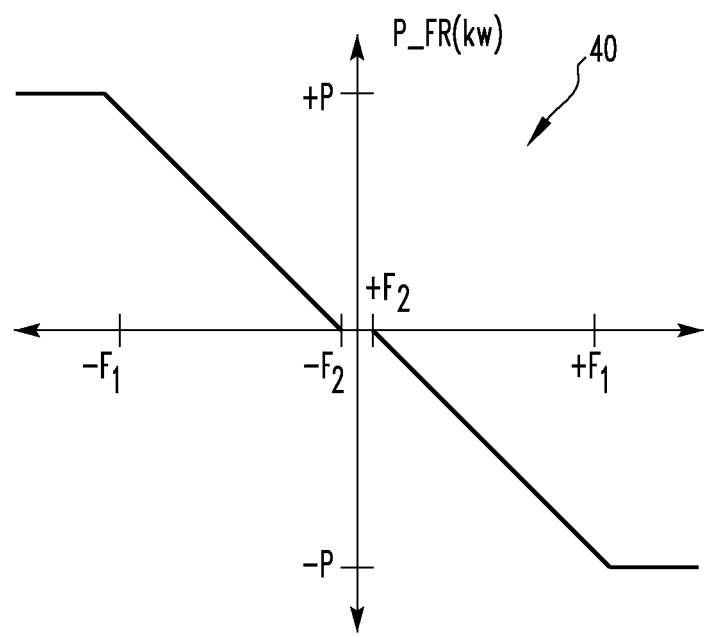
FIG. 5 is a schematic diagram of an exemplary droop characteristic according to another exemplary embodiment of the disclosed concept.

Next, at step 110, an energy storage reactive power requirement ($Q_{ES}$) is determined based on $V_{dev\_f}$, $V_{set\_f}$, and a predetermined curve such as, for example, and without limitation, the exemplary curve 38 shown in FIG. 3. The $Q_{ES}$ depends on the SCR (short circuit ratio) at the POI 8. In weak grids and at the end of long distribution feeders, this impedance is low—on the order of 6 to 10.

In one particular embodiment, the energy storage reactive power requirement ($Q_{ES}$) is given as follows:

$$Q_{ES} = \frac{Q_{mes}}{Z} * \frac{V_{dev\_f}}{V_{set\_f}},$$

where Qmes is maximum reactor power from the energy storage inverter or inverters and Z is the grid impedance derived from the short circuit ratio at the point of connection.

In one particular implementation, the energy storage reactive power requirement calculation is performed as described above only if the determined $V_{dev\_f}$ falls outside a predetermined dead band. In this implementation, if the determined $V_{dev\_f}$ falls within the predetermined dead band, $Q_{ES}$ is set equal to zero.

In the exemplary embodiment, the PV inverters provide the maximum reactive power that they can and the remaining is met by the Energy Storage inverter.

Thus, as will be appreciated, the steps of the methodology of FIG. 2 just described will result in the voltage at POI 8 being controlled to remain within certain predetermined specifications and limits by using reactive power management to specifically control the amount of reactive power provided by the number of PV inverters 12 and the ES inverter 26.

Figure 4:
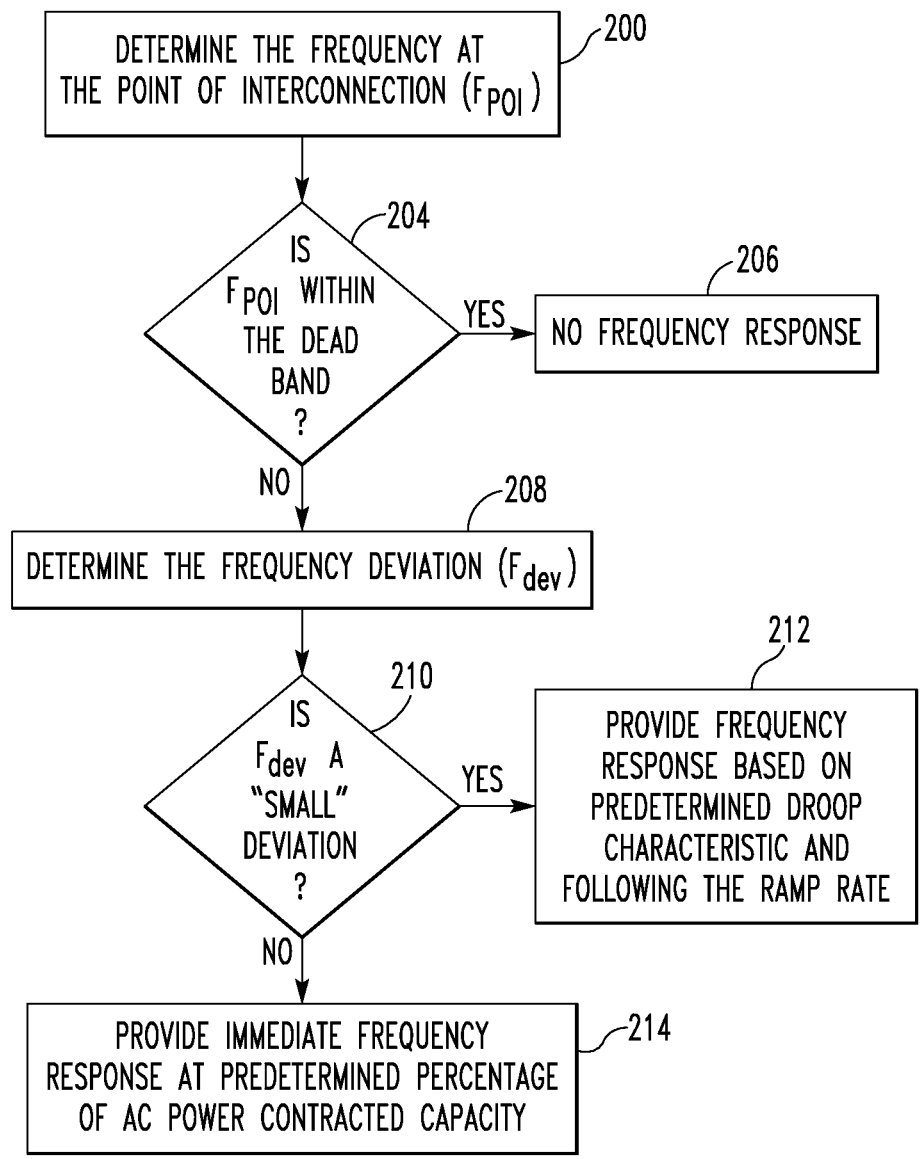
FIG. 4 is a flowchart showing a control methodology for controlling and managing frequency response of the renewable energy system of FIG. 1 according to one particular, non-limiting exemplary embodiment of the disclosed concept.

FIG. 4 is a flowchart showing a control methodology for controlling and managing frequency response of renewable energy system 4 according to one particular, non-limiting exemplary embodiment of the disclosed concept. In the exemplary embodiment, the control methodology shown in FIG. 4 is implemented in the form of a number of routines stored and executed by PLC 32. The control methodology of FIG. 4 begins at step 200, wherein the frequency at POI 8 ($F_{POI}$) is determined. In the exemplary embodiment, $F_{POI}$ is measured by metering device 36 and provided to PLC 32. Next, at step 204, a determination is made as to whether $F_{POI}$ is within a predetermined frequency dead band as compared to a rated frequency ($F_{rated}$) for electrical distribution system 2. In the non-limiting exemplary embodiment, the frequency dead band is 0.012 HZ above and below the rated frequency. If the answer at step 204 is yes, then the method proceeds to step 206 and no frequency response is provided. If, however, the answer at step 204 is no, then the frequency deviation ($F_{dev}$) is determined according to the following formula:

$$F_{dev}=|F_{POI}-F_{rated}|$$

Next, at step 210, a determination is made as to whether the determined $F_{dev}$ qualifies as a "small" deviation. A "small" deviation is a deviation that is less than some predetermined value. In the non-limiting exemplary illustrated embodiment, $F_{dev}$ qualifies as a "small" deviation if $F_{dev}<0.3$, although it will be appreciated that other values may be employed. If the answer at step 210 is yes, then the method proceeds to step 212. At step 212, ES inverter 26 is controlled in a manner in which it will provide a frequency response in the form of a real power output that is proportional to the frequency deviation. In particular, the real power output level is determined based upon the measured $F_{POI}$ and a predetermined droop characteristic, such as exemplary droop characteristic 40 shown in FIG. 5 which specifies a 5% droop characteristic and wherein linear functions are employed for "small" deviations. In addition, in the exemplary embodiment, the frequency response in this instance is provided in a manner that satisfies the predetermined ramp rate requirements. If, however, the answer at step 210 is no, meaning that $F_{dev}$ does not qualify as a "small" deviation but instead qualifies as a "large" deviation (i.e., a deviation greater than or equal to the predetermined value discussed above), then the method proceeds to step 214. At step 214, ES inverter 26 is controlled in a manner in which it will immediately provide a frequency response at a predetermined real power output level. In the exemplary embodiment, the predetermined real power output level is a predetermined percentage (e.g. 10%) of the AC power contracted capacity of renewable energy system 4. When the ES inverter operates for small deviations the real power output meets the ramp rate requirements of the real power but larger frequency deviations the response will not be limited by the ramp rate.

Thus, the method of FIG. 4 as just described employs ES inverter 26 and energy storage device 24 to provide a frequency response in a manner that satisfies the predetermined specifications and/or limits. In the event the storage capacity is reached, the ES inverter 26 will limit the power. When a diesel or natural gas generator is used to support the ES inverter 26, the generator is commanded to add power to the ES Inverter 26, or it can provide excess energy to charge energy storage device 24. In situations where the frequency is higher and the battery needs to be charged, the PV inverters 12 will curtail their output powers. When a diesel or natural gas generator is used, the PV inverters 112 will respond to higher frequencies as the generators cannot absorb real power.

In an alternative embodiment, a utility supervisory control and data acquisition (SCADA) system can determine the power to be injected for frequency support and command ES Inverter 26 accordingly.

Figure 6:
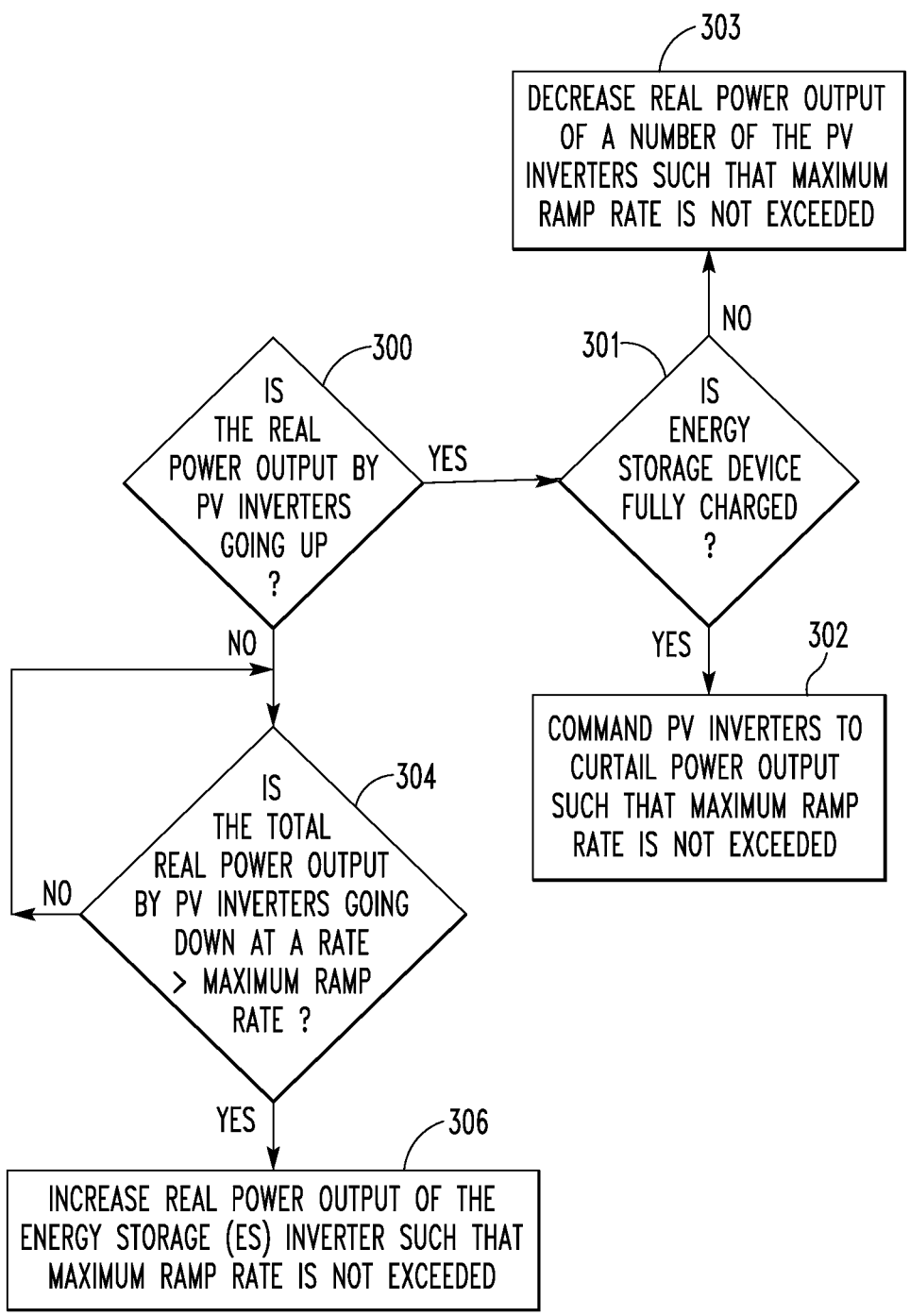
FIG. 6 is a flowchart showing a control methodology for controlling and managing the power ramp rates of the renewable energy system of FIG. 1 according to one particular, non-limiting exemplary embodiment of the disclosed concept.

FIG. 6 is a flowchart showing a control methodology for controlling and managing the power ramp rates of renewable energy system 4 according to one particular, non-limiting exemplary embodiment of the disclosed concept. In the exemplary embodiment, the control methodology shown in FIG. 6 is implemented in the form of a number of routines stored and executed by PLC 32. As described in detail below, the methodology of FIG. 6 is used to control the real power ramp rates of renewable energy system 4 (i.e., maintain them within prescribed limits) to account for conditions wherein PV inverters for may be ramping up power output due to favorable sun conditions (e.g., clearing cloud coverage) or conditions wherein PV inverters 4 may be ramping down power output due to unfavorable sun conditions (e.g. increasing cloud coverage). Normal solar irradiation changes are slow but changes due to cloud coverage and cloud clearings are rapid and the power ramp-up and ramp-down limits at the point of connection is an agreement made with the utility operator and the renewable farm owner. The real power ramp rates are the cumulative output of the farm.

The control methodology of FIG. 6 begins at step 300, wherein a determination is made as to whether the total real power output by PV inverters 12 is increasing. In the exemplary embodiment, this determination is made based upon measurements made by power metering device 34 that are provided to PLC 32. If the answer at step 300 is yes, then the method proceeds to step 301. At step 301, a determination is made as to whether the energy storage device 24 is fully charged. If the answer at step 301 is yes, then, at step 302, the PV inverters 12 are commanded to curtail power output such that the maximum ramp rate is not exceeded. If the answer at step 301 is no, then the method proceeds to step 303. At step 303, PLC 32 controls (decreased) the real power output of a number of the PV inverters 12 (by sending control signals to the controllers 14 thereof) in a manner such that the prescribed maximum ramp rate is not exceeded. If, however, the answer at step 300 is no, meaning that the total real power output by PV inverters 4 is decreasing, then the method proceeds to step 304. At step 304, a determination is made as to whether the total real power output by PV inverters 12 is going down at a rate that is greater than the prescribed maximum ramp rate. If the answer at step 304 is no, then the method returns to step 304 to monitor the rate at which the total real power output is decreasing. If the answer at step 304 is yes, then the method proceeds to step 306. At step 306, the real power output of ES inverter 26 is controlled (increased) (i.e., by providing control signals to its controller 28) in a manner such that the maximum ramp rate of the total real power being output by renewable energy system 4 will not exceed the prescribed maximum ramp rate. In this regard, ES inverter 26 is used to supplement the total real power output of renewable energy system 4 and therefore compensate for a rapid decrease in real power output of the PV inverters 12 due to, for example, unfavorable sun conditions. Thus, the methodology of FIG. 6 provides ramp rate control for renewable energy system 4 using ES inverter 26 and energy storage device 24 by controlling the real power output thereof. In one exemplary embodiment, the prescribed maximum ramp rate is 10% of the AC contracted capacity per minute, although it will be appreciated that other values may also be employed. The ES inverter 26 will also determine the state of charge on the battery source and determine if the battery can take more charge during a PV ramp-up (cloud clearing). If the ES inverter cannot charge the battery the PLC-32 will command the PV inverter 12 to reduce their power output (or limit their power output) to meet the power ramp-up limits requirements. (Note: the flow chart needs to be updated with this)

In one particular, non-limiting exemplary embodiment, the frequency response as described herein is not limited by the ramp rate control as described herein, and instead is decoupled from the ramp rate control. In this embodiment, frequency response is continuation operation even during a ramp rate of that, unless the ramp rate event requires its frequency response resources to be used for ramp rate control. In the exemplary embodiment, renewable energy system 4 will be able to simultaneously meet both requirements, as long as the ramp rate event does not require the frequency response resources to be used during the ramp rate control. If the ramp rate control uses all of the available energy resources, the frequency response control not be in effect during the specific period of time. In one particular embodiment, the portion of the energy storage components of renewable energy system 4 utilized for frequency response control chart of a storage capacity equivalent to 9 and a half minutes of the 10% AC contracted capacity this includes 9 minutes of full participation in one minute ramp down complying with the ramp rate requirements.

Figure 7:
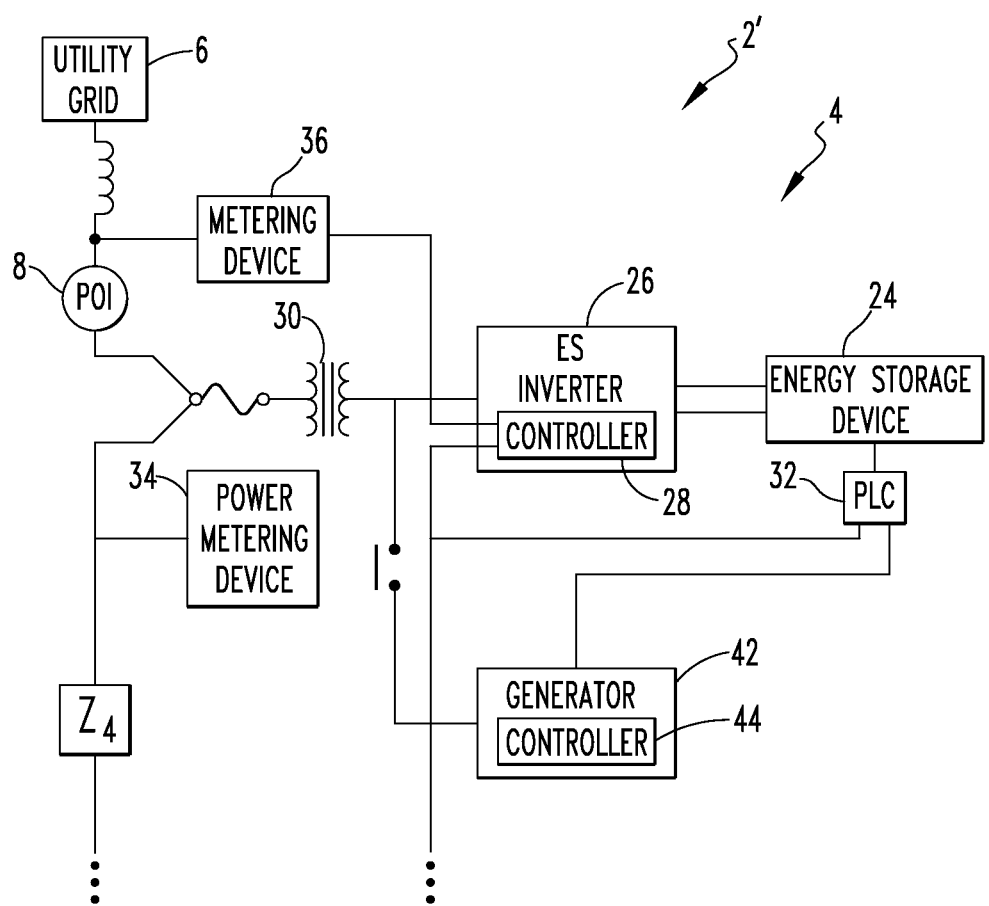
FIG. 7 is a schematic diagram of a portion of an electrical distribution system according to an alternative exemplary embodiment.

FIG. 7 is a schematic diagram of a portion of an alternative electrical distribution system 2' according to an alternative exemplary embodiment. Alternative electrical distribution system 2' is similar to electrical distribution system 2, and like components are labeled with like reference numerals. In alternative electrical distribution system 2', the voltage control and ramp rate control are provided in the same manner as in the electrical distribution system 2. However, frequency support is energy intensive and requires long-term power support. If the frequency support energy requirements are met with and energy storage device 24 such as a battery as in electrical distribution system 2, then the cost of storage increases. Thus, an alternative to such a configuration is provided in electrical distribution system 2', wherein the energy for frequency support is provided by a generator 42 (such as, without limitation, a diesel or natural gas generator) having a controller 44 that may be selectively coupled to a transformer 30 as shown. In the exemplary embodiment, the methodology for providing such frequency support is identical to that as shown in FIG. 4, except that at steps 212 and 214, generator 42 (rather than ES inverter 26) is controlled in a manner that provides the needed frequency response in the form of a real power output from generator 42 (note, this function is mainly for under frequency support). Alternatively, a utility supervisory control and data acquisition (SCADA) system can determine the power to be injected for frequency support and command generator 42 accordingly.

While the exemplary embodiments have been described herein in connection with renewables in the form of a number of PV arrays and PV inverters, it will be understood that that is meant to be exemplary only, and that other types of renewable energy sources, such as, without limitation, wind generation systems may also be used within the scope of the disclosed concept.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A renewable energy system coupled to a point of interconnection of an electrical distribution system, comprising:
    a plurality of renewable energy sources each including a renewable source inverter structured to output a renewable source power, the renewable source inverter of each of the renewable energy sources being coupled to a distribution line through a respective transformer at a respective renewable source coupling point on the distribution line in a manner wherein the renewable source powers of the renewable source inverters combine additively; and
    an energy storage source including an energy storage device coupled to an energy storage inverter, wherein the energy storage inverter is coupled to the distribution line at an energy storage source coupling point on the distribution line, wherein the energy storage source coupling point is located downstream of each of the renewable source coupling points and between the point of interconnection and each of the renewable source coupling points; and
    a control system operatively coupled to the energy storage source and the number of renewable energy sources, wherein the control system is structured and configured to: (i) control a voltage at the point of interconnection by controlling a renewable source reactive power output by each of the renewable source inverters based on a reactive power command calculated for each of the renewable source inverters and an energy storage reactive power output by the energy storage inverter, wherein for each renewable source inverter the reactive power command is calculated based on an impedance value comprising a total impedance of a portion of the distribution line and each of the respective transformers located between the renewable source inverter and the point of interconnection, and (ii) provide power ramp rate control for the renewable energy system by controlling at least one of a renewable source real power output by each of the renewable source inverters and a first energy storage real power output by the energy storage inverter.

2. The renewable energy system according to claim 1, wherein the control system is further structured and configured to control a frequency response of the renewable energy system by controlling a second energy storage real power output by the energy storage inverter.

3. The renewable energy system according to claim 1, further comprising a generator, wherein the control system is further structured and configured to control a frequency response of the renewable energy system by controlling a first generator real power output by the generator.

4. The renewable energy system according to claim 1, wherein each renewable energy source is a photovoltaic source including a photovoltaic array coupled to the renewable source inverter of the renewable energy source.

5. The renewable energy system according to claim 1, wherein the energy storage device is a battery.

6. The renewable energy system according to claim 1, wherein the control system includes a processing device coupled to a controller of the energy storage inverter and a controller of each renewable source inverter.

7. The renewable energy system according to claim 1, wherein the control system is structured and configured to control the voltage at the point of interconnection by determining a voltage drop along the distribution line associated with each renewable source inverter and using the voltage drop to control the renewable source reactive power output by the renewable source inverter.

8. The renewable energy system according to claim 7, wherein the control system is further structured and configured to control the voltage at the point of interconnection by first determining that each of the PV inverters has reached a maximum reactive power and then using the energy storage reactive power output by the energy storage inverter to also control the voltage at the point of interconnection.

9. The renewable energy system according to claim 1, wherein the control system is structured and configured to control the voltage at the point of interconnection by:
   determining a distribution line voltage associated with each renewable source inverter;
   determining a voltage deviation associated with each renewable source inverter based on a voltage set point associated with the renewable source inverter and the distribution line voltage associated with the renewable source inverter and a real power output by the renewable source inverter;
   determining a renewable reactive power command for each renewable source inverter based on at least the voltage deviation associated with the renewable source inverter;
   determining a voltage at the point of interconnection;
   determining a system voltage deviation based on the voltage at the point of interconnection and a system voltage set point; and
   determining a reactive power command for the energy storage inverter based on the system voltage deviation and the system voltage set point.

10. The renewable energy system according to claim 9, wherein the control system is further structured and configured to curtail real power output by one or more of the renewable energy sources when the energy storage source is no longer able to absorb additional power from the renewable energy sources.

11. The renewable energy system according to claim 2, wherein the control system is structured and configured to control the frequency response of the renewable energy system by determining a frequency at the point of interconnection, determining a frequency deviation based on a predetermined reference and the frequency at the point of interconnection, causing the energy storage inverter to output real power based on a predetermined droop characteristic and following a predetermined ramp rate limitation if a size of the frequency deviation is determined to be less than a predetermined value, and causing the energy storage inverter to immediately output real power at a predetermined level is the size of the frequency deviation is determined to be greater than or equal to the predetermined value.

12. The renewable energy system according to claim 2, wherein the control system is structured and configured to control the frequency response of the renewable energy system based on a measured frequency or a signal received from a utility supervisory control and data acquisition system.

13. The renewable energy system according to claim 3, wherein the control system is structured and configured to control the frequency response of the renewable energy system based on a measured frequency or a signal received from a utility supervisory control and data acquisition system.

14. The renewable energy system according to claim 13, wherein the control system is further structured and configured to curtail real power output by one or more of the renewable energy sources when the energy storage source is no longer able to absorb additional power from the renewable energy sources or when the renewable energy system employs a diesel or natural gas generator and the measured frequency is greater than a dead band.

15. The renewable energy system according to claim 1, wherein the control system in energy storage inverter is structured and configured to provide power ramp rate control for the renewable energy system by determining that a total real power output of the renewable source inverters is decreasing and in response thereto causing the energy storage inverter to output real power in a manner such that a rate of change of a total real power output by the renewable energy system at the point of interconnection does not exceed a predetermined maximum ramp rate or by determining that a total real power output of the renewable source inverters is increasing and in response thereto causing the energy storage inverter to absorb real power in a manner such that a rate of change of a total real power output by the renewable energy system at the point of interconnection does not exceed a predetermined maximum ramp rate.

16. A method of controlling a renewable energy system coupled to a point of interconnection of an electrical distribution system, the renewable energy system including a plurality of renewable energy sources each including a renewable source inverter coupled to a distribution line through a respective transformer at a respective renewable source coupling point on the distribution line, and an energy storage source including an energy storage device coupled to an energy storage inverter, wherein the energy storage inverter is coupled to the distribution line at an energy storage source coupling point on the distribution line, wherein the energy storage source coupling point is located downstream of each of the renewable source coupling points and between the point of interconnection and each of the renewable source coupling point, the method comprising:
   controlling a voltage at the point of interconnection by controlling a renewable source reactive power output by each of the number of renewable source inverters based on a reactive power command calculated for each of the renewable source inverters and an energy storage reactive power output by the energy storage inverter, wherein for each renewable source inverter the reactive power command is calculated based on an impedance value comprising a total impedance of a portion of the distribution line and each of the respective transformers located between the renewable source inverter and the point of interconnection; and
   providing power ramp rate control for the renewable energy system by controlling at least one of a renewable source real power output by each of the renewable source inverters and a first energy storage real power output by the energy storage inverter.

17. The method according to claim 16, further comprising controlling a frequency response of the renewable energy system by controlling a second energy storage real power output by the energy storage inverter or by controlling a generator real power output by a generator provided as part of the renewable energy system.

18. The method according to claim 16, wherein the controlling the voltage at the point of interconnection includes determining a voltage drop along the distribution line associated with each renewable source inverter and using the voltage drop to control the renewable source reactive power output by the renewable source inverter.

19. The method according to claim 18, wherein the controlling the voltage at the point of interconnection further includes determining a voltage at the point of interconnection and using the voltage at the point of interconnection to control the energy source reactive power output by the energy source inverter.

20. The method according to claim 16, wherein the controlling the voltage at the point of interconnection includes:
   determining a distribution line voltage associated with each renewable source inverter;
   determining a voltage deviation associated with each renewable source inverter based on a voltage set point associated with the renewable source inverter and the distribution line voltage associated with the renewable source inverter;
   determining a renewable reactive power command for each renewable source inverter based on at least the voltage deviation associated with the renewable source inverter;
   determining a voltage at the point of interconnection;
   determining a system voltage deviation based on the voltage at the point of interconnection and a system voltage set point;
   and
   determining a reactive power command for the energy storage inverter based on the system voltage deviation and the system voltage set point.

21. The method according to claim 17, wherein the controlling the frequency response of the renewable energy system includes determining a frequency at the point of interconnection, determining a frequency deviation based on a predetermined reference and the frequency at the point of interconnection, causing the energy storage inverter to output real power based on a predetermined droop characteristic and following a predetermined ramp rate limitation if a size of the frequency deviation is determined to be less than a predetermined value, and causing the energy storage inverter to immediately output real power at a predetermined level if the size of the frequency deviation is determined to be greater than or equal to the predetermined value.

22. The method according to claim 17, wherein the frequency response of the renewable energy system is controlled based on a measured frequency or a signal received from a utility supervisory control and data acquisition system.

23. The method according to claim 16, wherein the providing power ramp rate control for the renewable energy system includes determining that a total real power output of the renewable source inverters is decreasing and in response thereto causing the energy storage inverter to output real power in a manner such that a rate of change of a total real power output by the renewable energy system does not exceed a predetermined maximum ramp rate or determining that a total real power output of the renewable source inverters is increasing and in response thereto causing the energy storage inverter to absorb real power in a manner such that a rate of change of a total real power output by the renewable energy system does not exceed a predetermined maximum ramp rate.

24. The method according to claim 23, further comprising curtailing a real power output of the renewable source inverters in order to meet ramp up limits imposed at the point of interconnection in response to determining that a total real power output of the renewable source inverters is increasing and in response to determining that the energy storage source is no longer able to absorb additional power from the renewable energy sources.

* * * * *